(12) United States Patent
Wenger et al.

(10) Patent No.: US 7,963,214 B1
(45) Date of Patent: *Jun. 21, 2011

(54) EXTRUSION PROCESSING OF HIGH MEAT QUANTITY FEEDS USING PRECONDITIONER WITH HOT AIR INPUT

(75) Inventors: Marc Wenger, Sabetha, KS (US); Dennis H. Baumgartner, Sabetha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,321

(22) Filed: Sep. 17, 2010

Related U.S. Application Data

(60) Division of application No. 12/787,302, filed on May 25, 2010, now Pat. No. 7,811,617, which is a continuation-in-part of application No. 12/767,547, filed on Apr. 26, 2010.

(51) Int. Cl.
   *A21B 7/00* (2006.01)
   *B01F 15/06* (2006.01)

(52) U.S. Cl. .............. 99/348; 366/79; 366/144; 366/297

(58) Field of Classification Search .................. 366/144, 366/145
   See application file for complete search history.

(56) References Cited

U.S. PATENT DOCUMENTS

| | | | |
|---|---|---|---|
| 3,718,332 A * | 2/1973 | Jones | 280/735 |
| 3,913,238 A | 10/1975 | Updegrove | |
| 3,997,681 A | 12/1976 | Guyer | |
| 4,028,030 A | 6/1977 | Imhof | |
| 4,139,648 A | 2/1979 | Small et al. | |
| 4,615,901 A | 10/1986 | Yoshioka et al. | |
| 4,659,299 A | 4/1987 | Pierik | |
| 4,752,139 A | 6/1988 | Hauck | |
| 4,812,324 A | 3/1989 | Pierik | |
| 4,929,163 A | 5/1990 | Volk, Jr. | |
| 5,637,340 A * | 6/1997 | Greer | 426/456 |
| 5,887,972 A | 3/1999 | Dickmeiss et al. | |
| 6,074,578 A | 6/2000 | Csongor et al. | |
| 6,247,394 B1 * | 6/2001 | Huber et al. | 99/352 |
| 6,263,785 B1 | 7/2001 | Zittel | |
| 6,344,228 B1 | 2/2002 | Rubio et al. | |
| 6,383,544 B1 | 5/2002 | Elkins | |
| 6,465,029 B2 | 10/2002 | Wenger et al. | |
| 7,393,151 B1 | 7/2008 | Hermsmeyer et al. | |
| 7,404,262 B2 | 7/2008 | Jurkovich et al. | |
| 7,448,795 B2 | 11/2008 | Wenger et al. | |
| 2002/0141282 A1 * | 10/2002 | Tanaka et al. | 366/76.1 |
| 2004/0072920 A1 | 4/2004 | Goedicke et al. | |

(Continued)

FOREIGN PATENT DOCUMENTS

| | | |
|---|---|---|
| EP | 0610789 | 8/1994 |
| EP | 1027836 | 8/2000 |

*Primary Examiner* — Tony G Soohoo
(74) *Attorney, Agent, or Firm* — Hovey Williams LLP

(57) ABSTRACT

The present invention is directed to improved preconditioners (12) especially useful for the production of high meat-content pet foods. The preconditioners (12) include an elongated housing (16) with one or more elongated, axially rotatable mixing shafts (18, 20) therein, each having a plurality of outwardly extending mixing elements (42, 44). The preconditioner (12) is provided with apparatus (56) for directing relatively large quantities of heated non-steam gas into the preconditioner (12) in lieu of most or all of the steam normally used with preconditioners. This serves to heat material passing through the preconditioner (12) without the addition of substantial moisture.

6 Claims, 1 Drawing Sheet

U.S. PATENT DOCUMENTS

| | | |
|---|---|---|
| 2006/0093718 A1 | 5/2006 | Jurkovich et al. |
| 2006/0251791 A1 | 11/2006 | Rubio et al. |
| 2008/0069926 A1 | 3/2008 | Mueller et al. |
| 2008/0069927 A1 | 3/2008 | Altemueller |
| 2008/0075808 A1 | 3/2008 | Altemueller |
| 2008/0118607 A1 | 5/2008 | Sandoval et al. |
| 2008/0260913 A1 | 10/2008 | Orcutt et al. |
| 2009/0060779 A1* | 3/2009 | Chambe et al. .......... 422/4 |
| 2010/0043649 A1 | 2/2010 | Maupin et al. |
| 2010/0218688 A1 | 9/2010 | Zittel et al. |

* cited by examiner

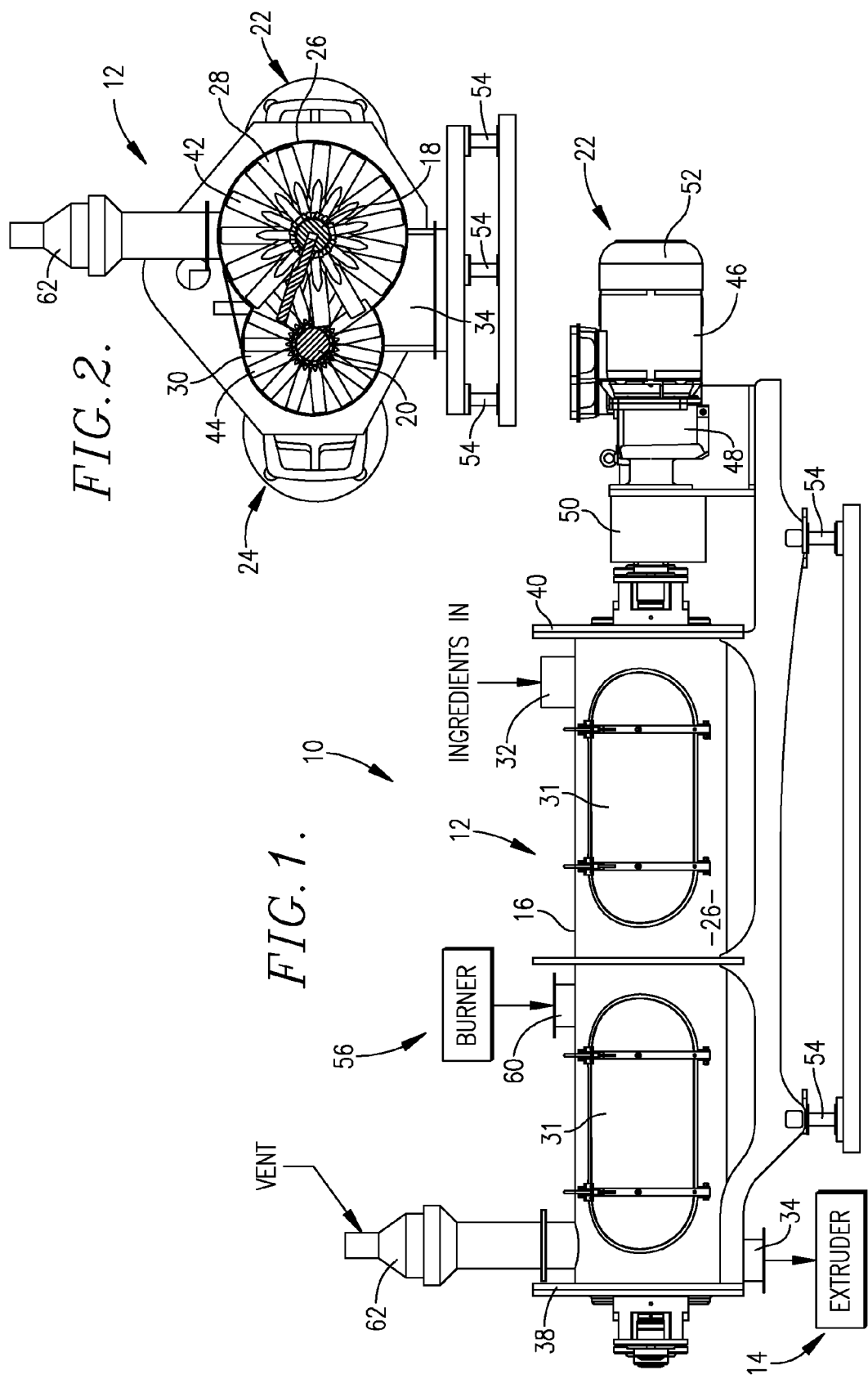

EXTRUSION PROCESSING OF HIGH MEAT QUANTITY FEEDS USING PRECONDITIONER WITH HOT AIR INPUT

CROSS-REFERENCE TO RELATED APPLICATION

This application is a division of U.S. patent application Ser. No. 12/787,302, filed May 25, 2010, which is a continuation-in-part of U.S. patent application Ser. No. 12/767,547, filed Apr. 26, 2010, both of which are incorporated herein by reference in their entirety.

BACKGROUND OF THE INVENTION

1. Field of the Invention

The present invention is broadly concerned with improved preconditioners for use with downstream extruders, wherein the majority or all of the thermal energy input to the preconditioner is in the form of heated non-steam gas, such as ambient air. More particularly, the invention is concerned with such preconditioners, as well as methods of processing using the preconditioners, wherein high meat content pet feeds can be produced without creation of excess moisture conditions within the feeds, which can plug conventional preconditioners.

2. Description of the Prior Art

A large volume of pet feeds, such as cat or dog feeds, is produced by extrusion. Generally speaking, a dry ingredient mixture containing respective quantities of grain protein, starch, and fat is fed to an extrusion system which serves to fully cook and form the starting ingredients as a complete feed. The extrusion systems typically include a preconditioner, such as that shown in U.S. Pat. No. 4,752,139, which serves to moisturize and partially pre-cook the starting ingredients, as well as a downstream extruder. During processing with such preconditioners, steam and/or water are injected into the preconditioner housing, and mixing shafts supporting paddles are rotated at a constant speed and at a preset rotational direction.

The extruder includes an elongated barrel presenting an inlet coupled with the outlet of the preconditioner, and a downstream, restricted orifice die. One or more elongated, axially rotatable, helically flighted screws are situated within the barrel in order to move the preconditioned ingredients along the length of the barrel, toward and through the outlet die. Generally, the extruder serves to heat and subject the ingredients to increasing levels of shear within the barrel, with the final cooking and shaping occurring at the die. A rotating knife is normally used to cut the extrudate into an appropriate size.

Premium pet food manufacturers increasingly wish to add fresh meat to the dry ingredients during extrusion processing. These types of feeds command higher prices in the marketplace. In the past, the practical maximum level of meat addition was about 40% by weight. If greater quantities of meat were used, the preconditioner would tend to plug up, making processing difficult or impossible.

A new generation of preconditioners is disclosed in U.S. Pat. No. 7,448,795. These preconditioners include an elongated housing with a pair of internal mixing shafts with outwardly extending paddles. The shafts are powered by individual variable speed drive mechanisms allowing infinite adjustment of the rotational speed of the shafts, as well as the ability to rotate the shafts in the same or opposite directions. With these improved preconditioners, much higher levels of meat can be added to feed formulations, on the order of 40-60% of the dry ingredients, by weight. However, it has been found with such high-meat mixtures that the native moisture content of the meat precludes addition of enough steam to the preconditioner to achieve the desired levels of cook. Thus, while higher meat quantities can pass through the preconditioner without plugging, insufficient cook levels are achieved for proper downstream extrusion.

There is accordingly a need in the art for modified preconditioners, extrusion systems, and methods which cannot only handle high meat feeds, but also achieve a sufficient level of cook for efficient downstream extrusion.

Animal feed products can also be produced using pellet mills or pellet presses. These devices are greatly different than extrusion cookers, and do not include an elongated barrel with internal(s) which are axially rotatable and helically flighted. Moreover, these types of processes use very little steam and typically have a maximum recipe moisture limitation over about 18%. If greater moisture levels exist, the processes generally will not work.

The following references are pertinent: U.S. Pat. Nos. 4,028,030, 4,659,299, 4,812,324, 4,929,163, 6,344,228, 7,396,151, and 7,404,262; U.S. Published Applications: 2006/0251791, 2006/0093718, 2008/0075808, 2008/0260913, 2008/0118607, 2008/0069926, 2008/0069927; and EP Publications: 1027836 and 0610789.

SUMMARY OF THE INVENTION

The present invention overcomes the problems outlined above, and provides an improved preconditioner especially adapted for use with a downstream extruder. Broadly speaking, the preconditioner is operable to precondition material for subsequent processing thereof by heating and/or moisturizing the material and achieving a level of cook of the material. The preconditioner includes an elongated housing presenting a material inlet and a material outlet and having at least one elongated, rotatable mixing shaft therein. Apparatus is coupled with the preconditioner housing in order to introduce non-steam heated gas into the housing during passage of material therethrough, in order to intimately mix the gas with the material as a partial or complete replacement for steam and/or water conventionally used with preconditioners.

As used herein, "non-steam heated gas" refers to a gas, which is not wholly in the form of steam and preferably having an absolute humidity of up to 50%, more preferably up to about 25%. The gas may be a mixture of gases such as air or a relatively pure gas. The non-steam heated gas may contain some steam, up to about 25% by volume, and more preferably up to about 15% by volume. Most preferably, the heated gas contains essentially no steam, so that the total heat input to the preconditioner consists essentially of the hot gas. In practice, the gas is ambient-derived air free of steam at any ambient absolute or relative humidity and is heated to a level of from about 150-750° C., more preferably from about 350-700° C., and most preferably from about 450-600° C.

The gas introduction apparatus is preferably in the form of a burner and a blower operably coupled with the preconditioner housing. More generally, the gas introduction apparatus has a powered heating device providing an extra heat input derived from the operation of the device but not from the preconditioning/extrusion process itself. Thus, the gas introduction apparatus does not wholly rely upon recovered heat, as in the case of recycling of exhaust gasses or effluent gasses from a pellet cooler or the like. Such heat recovery expedients do not provide sufficient quantities of highly heated gas required in the present invention. Examples of powered heating devices include fuel-fired burners, radiant heaters.

Advantageously, the apparatus is designed to introduce relatively large volumes of gas into the housing, normally at a cubic meter/hour rate of from about 60-240 times (more preferably from about 125-200 times) the cubic meter volume of the preconditioner housing. Thus, if a given housing had a volume of 100 cubic meters, the broad range of introduction rates would be from about 6,000-24,000 cubic meters/hour. In order to obtain adequate preconditioning, it is also desired to add from about 100,000-200,000 (more preferably from about 140,000-180,000) kJ/hr of thermal energy to the preconditioner. In the context of the present invention, at least about 60%, and more preferably from about 70-100%, of the total thermal energy input is derived from the introduced non-steam hot gas. The preferred preconditioner of the invention is also very efficient in terms of energy transfer. That is, the preconditioner should be operable to transfer from about 60-90%, and more preferably from about 80-88%, of the total thermal energy input to the material being preconditioned.

In particularly preferred forms, the preconditioner should be of the type described in U.S. Pat. No. 7,448,795 incorporated by reference herein. Such a preconditioner includes a pair of elongated, laterally spaced apart, axially rotatable shafts each having a plurality of outwardly extending mixing elements or paddles, with a drive assembly operably coupled with the shafts and capable of individually adjusting the speed and/or rotational direction of the shafts during passage of material through the preconditioner. The drive assembly is advantageously in the form of a pair of variable speed drives so that the respective shaft speeds can be infinitely varied. Also, the mixing elements of the shafts are axially offset and intercalated for maximum material mixing and self-wiping of the shafts and mixing elements.

The invention also provides extrusion assemblies made up of a preconditioner as described above with a downstream extruder, the latter including an elongated barrel separate from the preconditioner housing and having an inlet and a restricted orifice die outlet. At least one (and preferably two) elongated, helically flighted, axially rotatable screw assemblies are located within the barrel and are operable to move the material from the inlet toward and through the outlet. In such extrusion assemblies, the preconditioner material outlet is coupled with the barrel inlet. During extrusion, the material being processed is subjected to increasing levels of temperature, pressure and shear in order to create formed and cooked final extrudates.

The preconditioners and extrusion assemblies of the invention are particularly suited for the production of food or feed products having relatively high quantities of meat therein. A typical example would be pet foods having large amounts of fresh, uncooked meat as a part of the starting recipe. Thus, the invention provides a method for extruding such products by providing a starting material including respective quantities of protein, starch, and fat and containing at least about 30% by weight meat (more preferably, at least about 40% by weight, and most preferably from about 42-60% by weight), based upon the total weight of the dry ingredients taken as 100% by weight. This starting material is then preconditioned by passing the material through a preconditioner in accordance with the invention with the simultaneous introduction of non-steam heated gas into the preconditioner housing. This serves to heat and at least partially cook the material before downstream extrusion. Generally, the material leaving the preconditioner has a moisture content of from about 25-30% by weight, wet basis.

The protein content of the starting material is typically derived from a variety of sources, such as the meat as well as grain proteins (e.g., soy, wheat, corn, milo). The total protein content is usually between about 5-60% by weight, more preferably from about 20-45% by weight. The starch content of the starting feed material would normally be from about 0-45% by weight, whereas the fat content would usually be from about 5-25% by weight, where all of the foregoing percentages are based upon the total weight of the material taken as 100% by weight. The moisture content of the product exiting the extruder is typically in the range of from about 30-35% by weight, wet basis.

The meat content of the starting material may be selected from the group consisting of beef, pork, mutton, horse, venison, fowl, fish, and mixtures thereof, but in principle any meat could be used.

While the preconditioners of the invention make use of heated non-steam gas as a thermal energy source, other types of thermal energy may be used as well. For example, steam could be introduced into the preconditioner along with the non-steam gas, but it is preferred that at least about 50%, and more preferably at least about 70%, of the thermal energy to the preconditioner be derived from the non-steam gas. This is particularly the case where high meat concentration starting materials are used, and in many of these instances, the preconditioning is carried out without the introduction of water or steam into the preconditioner housing.

BRIEF DESCRIPTION OF THE DRAWINGS

FIG. 1 is a partially schematic side view of a preconditioner in accordance with the invention, operably coupled with a downstream extruder; and FIG. 2 is a vertical sectional view of the preconditioner illustrated in FIG. 1.

DETAILED DESCRIPTION OF THE PREFERRED EMBODIMENT

Turning now to the drawings, an extrusion system 10 is illustrated in FIG. 1 and generally includes a preconditioner 12 operably coupled with a downstream extruder 14. The system 10 is operable to receive starting materials with initial preconditioning and ultimate extrusion to create highly cooked, finished food or feed products.

The preconditioner 12 is of the general type disclosed in U.S. Pat. No. 7,448,795, and includes an elongated mixing vessel or housing 16 with a pair of parallel, elongated, axially extending mixing shafts 18 and 20 extending along the length thereof. The shafts 18, 20 are operably coupled with individual, identical variable drive devices 22, the latter in turn connected with a digital controller (not shown).

In more detail, the housing 16 has an elongated, transversely arcuate sidewall 26 presenting a pair of elongated, juxtaposed, intercommunicated chambers 28 and 30 (see FIG. 2), as well as a material inlet 32 and a material outlet 34. The chamber 28 has a larger cross-sectional area than the adjacent chamber 30, as is readily apparent in FIG. 2. The sidewall 26 has access doors 31 as well as conventional water and/or steam injector assemblies (not shown) along the length thereof. The opposed ends of the housing 16 have end plates 38, 40, as shown.

Each of the shafts 18, 20 has a plurality of radially outwardly extending mixing elements 42 and 44, which are designed to agitate and mix the starting materials fed to the preconditioner, and to convey the material from inlet 32 toward and out the outlet 34. The elements 42 are axially offset relative to the elements 44 and the elements 42, 44 are in intercalated (i.e., the elements 42 extend into the cylindrical operational envelope presented by shaft 20 and elements 44, and vice versa). Although the elements 42, 44 are illustrated as being substantially perpendicular to the shafts 18 and 20, the invention is not so limited; rather, the elements 42, 44 are adjustable in both length and pitch at the discretion of the user. Again referring to FIG. 2, it will be seen that the shaft 18 is located substantially along the center line of chamber 28, and that shaft 20 is likewise located substantially along the center line of the chamber 30.

The drives 22 are identical in terms of hardware, and each includes a drive motor 46, a gear reducer 48, and a coupling assembly 50 serving to connect the drive to a corresponding shaft 18 or 20. The drives 22, 24 also have variable frequency devices 52, which are designed to permit selective, individual rotation of the shafts 18, 20 in terms of speed and/or rotational direction independently of each other. In this way, each of the shafts 18, 20 can be individually rotated through an infinite range of speeds.

In preferred forms, the preconditioner 12 may be conventionally supported as indicated at 54, or if desired may be mounted on weighing devices such as load cells which are coupled with the digital controller. The use of load cells permits rapid, on-the-go variation in the retention time of material passing through the housing 16, as described in U.S. Pat. No. 6,465,029, incorporated in its entirety by reference herein.

The use of the preferred variable frequency drives 22, 24 allow high-speed adjustments of the rotational speeds of the shafts 18, 20 while avoiding any collisions between the intercalated mixing elements 42, 44.

The preconditioner 12 further includes apparatus 56 for the introduction of non-steam hot gas into housing 16. In this case, the apparatus 56 includes a fuel-fired burner 58 operably coupled to an inlet 60 on housing 16. This apparatus thus serves to heat and introduce large volumes of ambient air into housing 16 where, owing to the rotation of the mixing shafts 18 and 20, the hot air comes into intimate thermal contact with the material being processed. Thereafter, the air passes outwardly through downstream vent 62. It will thus be observed that the flow of hot air is in co-current relationship relative to the flow of material being processed within housing 16. Of course, countercurrent flow of such hot air could also be employed.

The extruder 14 is itself entirely conventional and well known to those skilled in the art. Generally speaking, an extruder of this type includes an elongated, multiple-section barrel with a material inlet and a restricted orifice die outlet. One or more elongated, axially rotatable, helically flighted screw assemblies are located within the barrel and serve to subject the preconditioned material from preconditioner 12 to increasing levels of temperature, pressure, and shear to create the final products.

The following examples set forth preferred apparatus and methods in accordance with the invention. It is to be understood, however, that these examples are provided by way of illustration only, and nothing therein should be considered as a limitation upon the overall scope of the invention.

EXAMPLE 1

In this example, a series of test runs were carried out using the modified preconditioner of the invention, as illustrated in FIGS. 1-2 and including the apparatus 56 for the introduction of hot ambient air into the preconditioner housing. The preconditioner was coupled with a downstream twin screw extruder (Wenger Model TX 760). The extruder is of the type disclosed in U.S. Pat. No. 7,521,076, incorporated by reference herein.

In each run, standard dog food dry recipe ingredients were fed to the preconditioner and extruder, along with fresh chicken meat in the amounts set forth below. In Runs 1-3, steam was added to the preconditioner, whereas in Runs 4-5, no steam was used.

| | | Product | | | | |
|---|---|---|---|---|---|---|
| | | Pet Food | Pet Food | Pet Food | Pet Food | Pet Food |
| | | | | Run Number | | |
| | | 1 | 2 | 3 | 4 | 5 |
| | | | | Extruder Model | | |
| | | TX760 | TX760 | TX760 | TX760 | TX760 |
| | | | | Preconditioner Model | | |
| | Units | 450 HIP | 450 HIP | 450 HIP | 450 HIP | 450 HIP |
| Dry Recipe Parameters | | | | | | |
| Dry Recipe Moisture Content | % wb | 5.53 | 4.53 | 4.53 | 4.53 | 4.53 |
| Dry Recipe Temperature | ° C. | 11 | 11 | 13 | 11 | 11 |
| Dry Recipe Rate | kg/hr | 1000 | 1000 | 1000 | 1000 | 1750 |
| Burner Parameters | | | | | | |
| Combustion Air | m3/hr | 78 | 78 | 78 | 78 | 78 |
| Burner Sizing | kJ/hr | 263764 | 263764 | 263764 | 263764 | 263764 |
| Ambient Air Temperature | ° C. | | | | 34 | 34 |
| Inlet Air Temperature | ° C. | | | | 542 | 538 |
| Exit Air Temperature | ° C. | | | | 56 | 56 |
| Preconditioner Parameters | | | | | | |
| Large Shaft Speed/Rotation | | 80 F | 80 F | 80 F | 80 F | 80 F |
| Small Shaft Speed/Rotation | | 800 R | 800 R | 800 R | 800 R | 800 R |
| Steam Flow to Preconditioner | kg/hr | 78 | 83 | 70 | 0 | 0 |
| Adjusted Steam Flow to Preconditioner | kg/hr | 78 | 83 | 83 | 0 | 0 |
| Water Flow to Preconditioner | kg/hr | 0 | 0 | 0 | 0 | 0 |
| Process Water Temperature | ° C. | 9 | 9 | 9 | 9 | 9 |

-continued

| | | Product | | | | |
|---|---|---|---|---|---|---|
| | | Pet Food | Pet Food | Pet Food | Pet Food | Pet Food |
| | | \multicolumn{5}{c}{Run Number} | | | | |
| | | 1 | 2 | 3 | 4 | 5 |
| | | \multicolumn{5}{c}{Extruder Model} | | | | |
| | | TX760 | TX760 | TX760 | TX760 | TX760 |
| | | \multicolumn{5}{c}{Preconditioner Model} | | | | |
| | Units | 450 HIP | 450 HIP | 450 HIP | 450 HIP | 450 HIP |
| Meat Addition | kg/hr | 700 | 750 | 750 | 750 | 1313 |
| Meat Temperature | °C. | 40 | 34 | 35 | 31 | 41 |
| Meat Moisture | % wb | 68 | 68 | 68 | 68 | 68 |
| Preconditioner Discharge Temp | °C. | 66 | 66 | 66 | 50 | 48 |
| Preconditioner Weight | kg | 101 | 101 | 100 | 88 | 106 |
| Extruder Barrel Parameters | | | | | | |
| Extruder Shaft Speed | rpm | 600 | 600 | 600 | 600 | 600 |
| Motor Load | % IQ | 13 | 13 | 14 | 16 | 31 |
| Power Meter | kW | 8.3 | 8.4 | 10.3 | 10.4 | 20.8 |
| Steam Flow to Extruder | kg/hr | 101 | 102 | 100 | 140 | 213 |
| Water Flow to Extruder | kg/hr | 0 | 0 | 0 | 0 | 0 |
| Process Water Temperature | °C. | 25 | 25 | 25 | 25 | 25 |
| Extruder Motor Power | hp | 150 | 150 | 150 | 150 | 150 |
| Rated Shaft Speed | rpm | 730 | 730 | 730 | 730 | 730 |
| Final Extruder Temperature | °C. | 47 | 93 | 88 | 88 | 88 |
| Extruder Pressure | psig | 200 | 225 | 250 | 350 | 450 |
| Product Properties | | | | | | |
| Preconditioner Discharge Moisture | % wb | 33.79 | 33.62 | 34.04 | 31.79 | 32.02 |
| Extruder Discharge Moisture | % wb | 36.33 | 35.42 | 38.21 | 35.82 | 35.18 |
| Extruder Discharge Density | kg/m3 | 592 | 626 | 608 | 548 | 613 |
| Product Temperature at Inlet of Cooling Belt | °C. | 87 | 94 | 94 | 96 | 94 |
| Product Temperature at Discharge of Cooling Belt | °C. | 51 | 76 | 77 | 74 | 76 |
| Product Temperature at Discharge of Pneumatic System | °C. | | 37 | | | |
| Dry Recipe Calculations | | | | | | |
| Dry Recipe Specific Heat | kJ/kg · °C. | 1.649 | 1.622 | 1.622 | 1.622 | 1.622 |
| Dry Recipe Energy | kJ/hr | 18139 | 17842 | 21086 | 17842 | 31224 |
| Preconditioner Calculations | | | | | | |
| Steam Enthalpy | kJ/kg | 2721 | 2721 | 2721 | 2721 | 2721 |
| Steam Energy | kJ/hr | 212238 | 225843 | 225843 | 0 | 0 |
| Water Energy | kJ/hr | 0 | 0 | 0 | 0 | 0 |
| Meat Energy | kJ/hr | 93160 | 84843 | 87338 | 77356 | 179111 |
| Energy From Hot Air | kJ/hr | | | | 139229 | 179538 |
| Calculated Moisture in Preconditioner | % wb | 34.3 | 34.8 | 34.8 | 31.7 | 31.7 |
| Specific Heat Adjustment Factor | kJ/kg · °C. | 0.30 | 0.30 | 0.30 | 0.30 | 0.30 |
| Specific Heat in Preconditioner | kJ/kg · °C. | 2.72 | 2.74 | 2.74 | 2.65 | 2.65 |
| Product Mass Flow in Preconditioner | kg/hr | 1778 | 1833 | 1833 | 1750 | 3063 |
| Thermal Energy Added in Preconditioner | kJ/hr | 305398 | 310686 | 313181 | 216585 | 358649 |
| Total Thermal Energy in Preconditioner | kJ/hr | 323537 | 328528 | 334267 | 234427 | 389873 |
| Specific Thermal Energy in Preconditioner (as is) | kJ/kg | 182 | 179 | 182 | 134 | 127 |
| Preconditioner Discharge Energy | kJ/hr | 288093 | 292350 | 297706 | 207858 | 345800 |
| Calculated Preconditioner Discharge Temperature | °C. | 67 | 66 | 67 | 51 | 48 |
| Calculated Preconditioner Retention Time | min | 3.41 | 3.31 | 3.27 | 3.02 | 2.08 |
| Extruder Barrel Calculations | | | | | | |
| Steam Enthalpy | kJ/kg | 2770 | 2770 | 2770 | 2770 | 2770 |
| Steam Energy | kJ/hr | 279770 | 282540 | 277000 | 387800 | 590010 |

-continued

| | Units | Pet Food 1 | Pet Food 2 | Pet Food 3 | Pet Food 4 | Pet Food 5 |
|---|---|---|---|---|---|---|
| | | \multicolumn{5}{c}{Run Number} | | | | |
| | | \multicolumn{5}{c}{Extruder Model} | | | | |
| | | TX760 | TX760 | TX760 | TX760 | TX760 |
| | | \multicolumn{5}{c}{Preconditioner Model} | | | | |
| | | 450 HIP | 450 HIP | 450 HIP | 450 HIP | 450 HIP |
| Water Energy | kJ/hr | 0 | 0 | 0 | 0 | 0 |
| Total Mass Flow in Extruder Barrel | kg/hr | 1879 | 1935 | 1933 | 1890 | 3276 |
| Total Mass Flow in Extruder Barrel (10% moisture basis) | kg/hr | 1299 | 1329 | 1327 | 1327 | 2326 |
| Specific Heat in Extruder Barrel | kJ/kg · °C. | 2.516 | 2.526 | 2.526 | 2.489 | 2.47 |
| Thermal Energy Added in Extruder Barrel | kJ/hr | 279770 | 282540 | 277000 | 387800 | 590010 |
| Thermal Energy in Extruder Barrel | kJ/hr | 567863 | 574890 | 574706 | 595658 | 935810 |
| Extruder Motor Power | kW | 111.9 | 111.9 | 111.9 | 111.9 | 111.9 |
| Total Mechanical Energy | kJ/hr | 29880 | 30240 | 37080 | 37440 | 74880 |
| Total Energy | kJ/hr | 597743 | 605130 | 611786 | 633098 | 1010690 |
| Total Specific Energy (as-is) | kJ/kg | 318 | 313 | 316 | 335 | 309 |
| Total Specific Energy (10% moisture basis) | kJ/kg | 460 | 455 | 461 | 477 | 435 |
| Total Specific Energy (as-is dry recipe) | kJ/kg | 598 | 605 | 612 | 633 | 578 |
| Calculated Moisture in Extruder Barrel | % wb | 37.8 | 38.2 | 38.2 | 36.8 | 36.1 |
| Specific Thermal Energy In Extruder Barrel (as is) | kJ/kg | 302 | 297 | 297 | 315 | 286 |
| Specific Mechanical Energy (as-is) | kJ/kg | 16 | 16 | 19 | 20 | 23 |
| Specific Mechanical Energy (10% moisture basis) | kJ/kg | 23 | 23 | 28 | 28 | 32 |
| Specific Mechanical Energy (10% moisture basis) | kW-hr/mton | 6.4 | 6.3 | 7.8 | 7.8 | 8.9 |
| Specific Mechanical Energy (as-is dry recipe) | kJ/kg | 30 | 30 | 37 | 37 | 43 |
| Specific Mechanical Energy (as-is dry recipe) | kW-hr/mton | 8.3 | 8.4 | 10.3 | 10.4 | 11.9 |
| Specific Thermal Energy (as-is dry recipe) | kJ/kg | 585 | 593 | 590 | 604 | 542 |
| Temperature Behind Die | °C. | 126 | 124 | 125 | 135 | 125 |
| Thermal to Mechanical Energy Ratio | | 19.6 | 19.6 | 15.9 | 16.1 | 12.7 |

EXAMPLE 2

In this series of runs, additional high meat pet feed products were prepared. The dry recipe included 53% by weight corn, 22% by weight poultry meal, 15% by weight soybean meal, and 10% by weight corn gluten meal. The added meat was fresh MD chicken meat having a moisture content of 72.83% by weight, fat 14.54% by weight, and protein 12.63% by weight. The extruder was a standard Wenger TX760, as set forth in Example 1. Two Wenger Model 450 preconditioners were used. The first precondition was of the type described herein, including hot air introduction. The second preconditioner was downstream of the first and was a standard preconditioner. The output from the second preconditioner was fed into the extruder.

Run 6 was a control with the dry recipe, heated air, and water only to the first preconditioner, with steam introduction to the downstream extruder. Runs 7-10 were similar, with Run 7 including 38% by weight fresh heated meat (23° C.); Run 8 including 38% by weight cold meat (5° C.); Run 9 including 50% by weight fresh cold meat; and Run 10 having 76% by weight fresh cold meat.

| Run Number | 6 | 7 | 8 | 9 | 10 |
|---|---|---|---|---|---|
| | \multicolumn{5}{c}{Raw Materials} | | | | |
| Feed Rate (lbs/hr) | 2,200 | 2,200 | 2,200 | 2,200 | 2,200 |
| Bulk Density (lbs/cu ft) | 38.0 | 38.0 | 38.0 | 38.0 | 38.0 |
| | \multicolumn{5}{c}{Hybrid HI DDC (Line 4)} | | | | |
| Water (lbs/hr) | 0 | 0 | 0 | 0 | 0 |
| Water (% to Feed Rate) | 0.0% | 0.0% | 0.0% | 0.0% | 0.0% |
| Steam (lbs/hr) | 0 | 0 | 0 | 0 | 0 |
| Steam (% to Feed Rate) | 0.0% | 0.0% | 0.0% | 0.0% | 0.0% |
| Small Shaft Direction (F or R) | REV | REV | REV | REV | REV |
| Small Shaft Speed (RPM) | 800 | 800 | 800 | 800 | 800 |
| Small Shaft Load (%) | 50.0% | 52.0% | 52.0% | 56.0% | NA |
| Small HP | 50 | 50 | 50 | 50 | 50 |
| Small SME (kWHr/Ton) | 14.1 | 17.6 | 17.1 | 22.8 | NA |
| Large Shaft Direction (F or R) | FWD | FWD | FWD | FWD | FWD |
| Large Shaft Speed(RPM) | 50 | 50 | 50 | 50 | 50 |
| Large Shaft Load (%) | 80.0% | 74.0% | 68.0% | 77.0% | NA |

-continued

| Run Number | 6 | 7 | 8 | 9 | 10 |
|---|---|---|---|---|---|
| Large HP | 50 | 50 | 50 | 50 | 50 |
| Large SME (kWHr/Ton) | 13.8 | 14.9 | 13.4 | 18.0 | NA |
| Total DDC SME (kWHr/Ton) | 27.9 | 32.5 | 30.5 | 40.8 | NA |
| Weight (lbs) | NA | NA | NA | NA | NA |
| Retention Time (Minutes) | NA | NA | NA | NA | NA |
| Downspout Temp (Deg F.) | 131 | 132 | 132 | 129 | NA |
| Meat Temperature (F.) | NA | 75 | 5 | 5 | 5 |
| Meat Addition (lbs/hr) | 0 | 836 | 836 | 1,100 | 1,672 |
| Meat Addition (% to feed rate) | 0.0% | 38.0% | 38.0% | 50.0% | 76.0% |
| 450 HIP (Line 1) | | | | | |
| Water (lbs/hr) | 0 | 0 | 0 | 0 | 0 |
| Water (% to Feed Rate) | 0 | 0 | 0 | 0 | 0 |
| Steam (lbs/hr) | 162 | 167 | 166 | 157 | 166 |
| Steam (% to Feed Rate) | 7.4% | 7.6% | 7.5% | 7.1% | 7.5% |
| DDC Small (L) Shaft Direction (F or R) | REV | REV | REV | REV | REV |
| DDC Small (L) Shaft Speed (RPM) | 800 | 800 | 800 | 800 | 800 |
| DDC Small (L) Shaft Load (%) | 9.1% | 10.1% | 9.9% | 10.1% | NA |
| DDC Small (L) HP | 20 | 20 | 20 | 20 | 20 |
| DDC Small SME (kWHr/Ton) | 13.0 | 14.4 | 13.3 | 14.4 | NA |
| DDC Large ® Shaft Direction (F or R) | FWD | FWD | FWD | FWD | FWD |
| DDC Large ® Shaft Speed (RPM) | 50 | 50 | 50 | 50 | 50 |
| DDC Large ® Shaft Load (%) | 7.1% | 8.4% | 8.1% | 8.5% | NA |
| DDC Large ® HP | 20 | 20 | 20 | 20 | 20 |
| DDC Large SME (kWHr/Ton) | 11.0 | 11.1 | 10.8 | 12.1 | NA |
| Total DCC SME (kWHr/Ton) | 24.0 | 25.5 | 24.1 | 26.5 | NA |
| Cylinder Weight (lbs) | 235 | 265 | 257 | 260 | NA |
| Cylinder Retention Time (Minutes) | 5.97 | 4.96 | 4.82 | 4.51 | NA |
| Cylinder Downspout Temp (Deg F) | 162 | 168 | 172 | 171 | 169 |
| TX-760 (Line 1) | | | | | |
| HP | 150 | 150 | 150 | 150 | 150 |
| Water (lbs/hr) | 0 | 0 | 0 | 0 | 0 |
| Water (% to Feed Rate) | 0.0% | 0.0% | 0.0% | 0.0% | 0.0% |
| Steam (lbs/hr) | 186 | 136 | 161 | 169 | 116 |
| Steam (% to Feed Rate) | 8.5% | 6.2% | 7.3% | 7.7% | 5.3% |
| RPM | 500 | 500 | 500 | 500 | 500 |
| Load (lq)(%) | 25.4% | 26.5% | 25.7% | 26.0% | NA |
| SME (lq) (kW-Hr /Ton) (As-Is) | 22.3 | 17.8 | 17.1 | 16.0 | NA |
| Load (l) (%) | 36.1% | 36.3% | 35.7% | 35.9% | NA |
| SME (l) (kW-Hr /Ton) (As-Is) | 31.7 | 24.3 | 23.7 | 22.1 | NA |
| Final Head Temperature (F.) | 203.0 | 212.0 | 213.0 | 219.0 | 223.0 |
| Knife RPM | 1,200 | 1,800 | 1,800 | 1,800 | 1,800 |
| Total Process | | | | | |
| SME (lq) (kW-Hr /Ton) (As-Is) | 74.2 | 75.8 | 71.7 | 83.3 | NA |
| SME (l) (kW-Hr /Ton) (As-Is) | 83.6 | 82.3 | 78.3 | 89.4 | NA |

We claim:

1. An extrusion system for processing of food or feed products, comprising:
a preconditioner including an elongated housing presenting an inlet and an outlet and operable to at least partially cook said food or feed products,
said preconditioner including a pair of elongated, laterally spaced apart, axially rotatable shafts within said housing and each having a plurality of outwardly extending mixing elements, and a drive assembly operably coupled with said shafts and configured to individually adjust the speed and/or rotational direction of said shafts during said passage of material through the preconditioner housing;
a powered heating device operably coupled with said preconditioner, said device including a blower configured to introduce non-steam heated gas into said housing at a cubic meter/hour rate of from about 60-240 times the cubic meter volume of said preconditioner housing, said device further including apparatus configured to heat said introduced gas to a temperature of from about 350-700° C.; and
an extruder presenting an elongated barrel separate from said preconditioner housing and having an inlet and a restricted orifice die outlet, with at least one elongated, helically flighted, axially rotatable screw assembly within said barrel and operable to move material from said inlet toward and through said outlet,
said housing outlet operably connected with said barrel inlet so as to deliver preconditioned material from the preconditioner into said barrel.

2. A preconditioner operable to precondition food or feed material for subsequent processing thereof, said preconditioner comprising:
an elongated housing presenting a material inlet and a material outlet,
said preconditioner including a pair of elongated, laterally spaced apart, axially rotatable shafts within said housing and each having a plurality of outwardly extending mixing elements, and a drive assembly operably coupled with said shafts and configured to individually adjust the speed and/or rotational direction of said shafts during said passage of material through the preconditioner housing; and
apparatus including a powered heating device operably coupled with said housing, said device including a blower configured to introduce non-steam heated gas into said housing at a cubic meter/hour rate of from about 60-240 times the cubic meter volume of said preconditioner housing during passage of said material through said housing, said device further including apparatus configured to heat said introduced gas to a temperature of from about 350-700° C.,
said preconditioner operable to partially cook said food or feed material.

3. The preconditioner of claim 2, said preconditioner further configured to transfer from about 60-90% of the total thermal energy input to said preconditioner into said material.

4. The preconditioner of claim 2, said apparatus further configured to add from about 100,000-200,000 kJ/hr thermal energy to said preconditioner during passage of said material through said housing.

5. The preconditioner of claim 2, said non-steam heated gas being ambient air.

6. The preconditioner of claim 2, said apparatus further configured to introduce non-steam heated gas into said housing at a cubic meter/hour rate of from about 125-200 times the cubic meter volume of said preconditioner housing, and to add from about 140,000-180,000 kJ/hr thermal energy to said preconditioner, during passage of said material through said housing, and said preconditioner configured to transfer from about 80-88% of the total thermal energy input to the preconditioner into said material during said passage thereof through said housing.

* * * * *